Figure 1:
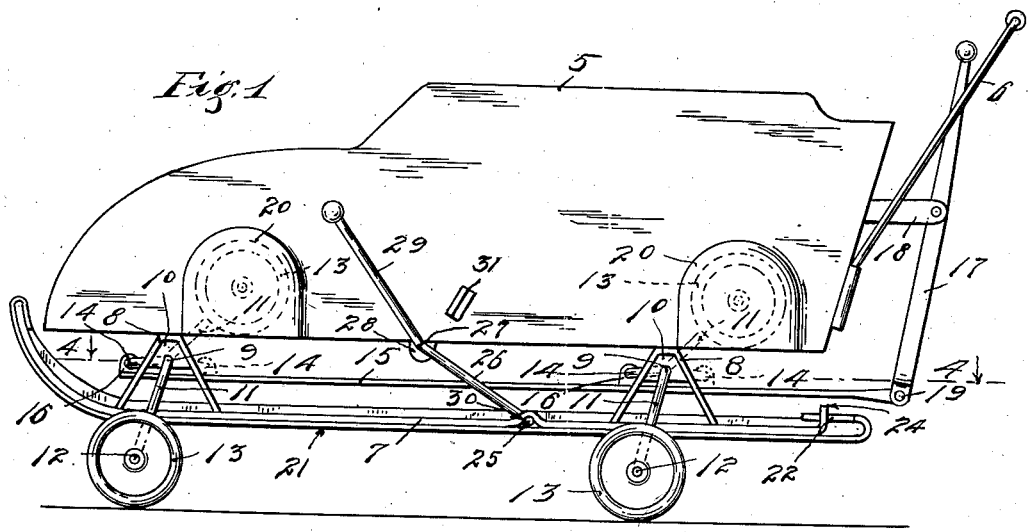

April 26, 1949.

A. B. OSTBY 2,468,271

BABY CARRIAGE

Filed May 7, 1947

2 Sheets-Sheet 1

INVENTOR.
Arne B. Ostby
BY Harry D. Kilgore
Attorney

April 26, 1949.  A. B. OSTBY  2,468,271
BABY CARRIAGE

Filed May 7, 1947  2 Sheets-Sheet 2

INVENTOR.
Arne B. Ostby
BY Harry D. Kilgore
Attorney

Patented Apr. 26, 1949

2,468,271

UNITED STATES PATENT OFFICE 2,468,271

BABY CARRIAGE

Arne B. Ostby, Minneapolis, Minn.

Application May 7, 1947, Serial No. 746,493

4 Claims. (Cl. 280—11)

My invention relates to improvements in baby carriages, and more particularly, to a convertible baby carriage.

The object of this invention is to provide a baby carriage that is convertible from a wheeled vehicle to a runner-equipped vehicle or sled and from a sled to a vehicle that moves on rockers.

To the above end, the invention consists of the novel devices and combination of devices hereinafter described and defined in the claims.

In the accompanying drawings, which illustrate the invention, like characters indicate like parts throughout the several views.

Figure 2:
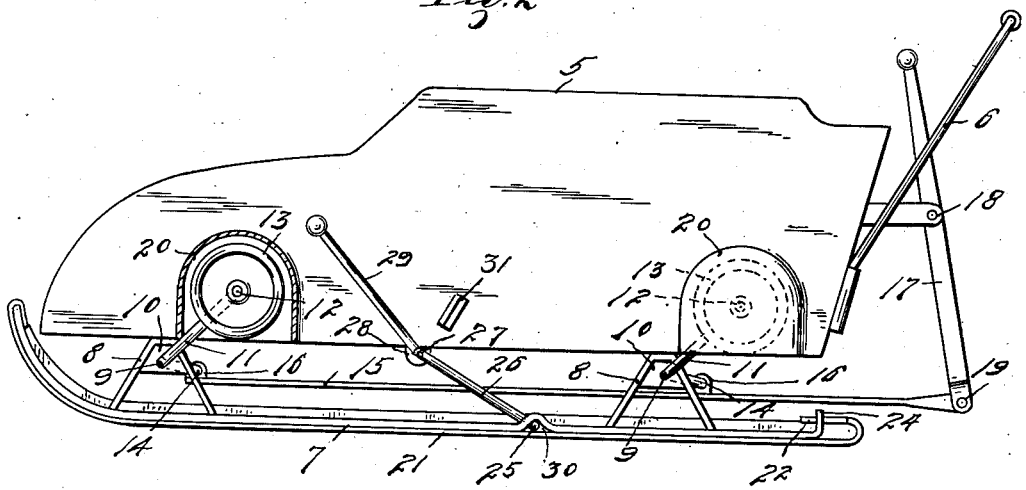
Figure 3:
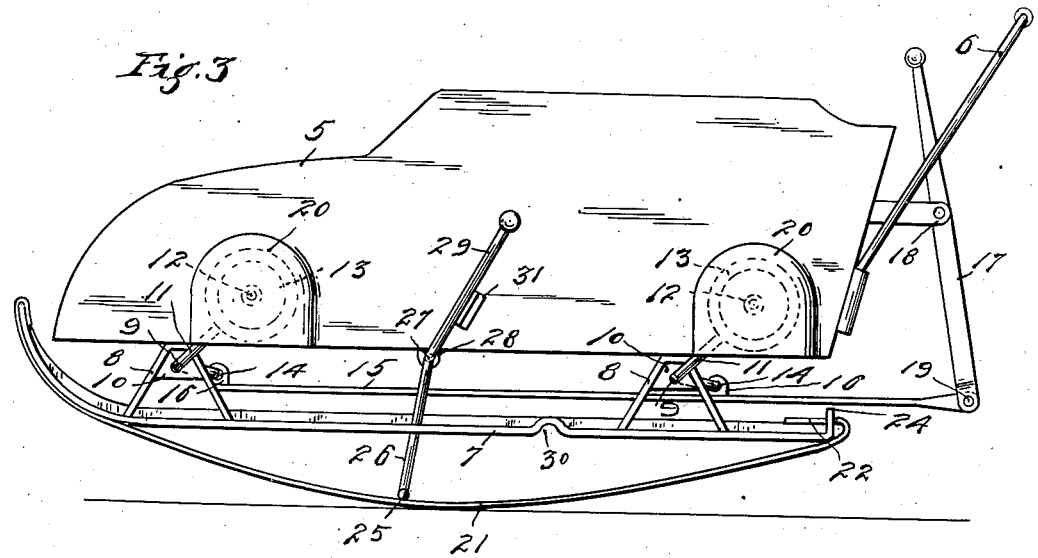
Figure 4:
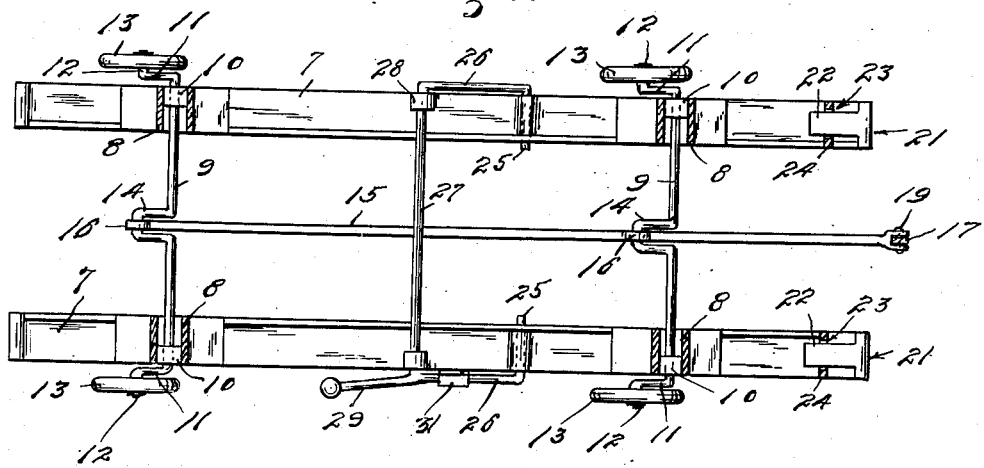

Referring to the drawings:

Figs. 1, 2 and 3 are elevational views of the invention when used as a wheeled vehicle, a sled or a rocker, respectively; and Fig. 4 is a view partly in plan and partly in horizontal section taken on the line 4—4 of Fig. 1.

The numeral 5 indicates the body of the vehicle having on its back a push handle 6 of the yoke type. A pair of runners 7 is secured to the body 5 by front and rear pairs of knees 8.

Front and rear rock shafts 9 are journaled in bearings 10 in the knees 8 and have on their outer ends crank arms 11. These crank arms 11 have on their outer ends stub crank axles 12 on which are journaled ground wheels 13.

The rock shafts 9 have intermediate U-cranks 14 that are simultaneously operated, to raise or lower the wheels 13, by a long link 15 having bearings 16 in which the cranks 14 are journaled. The link 15 in turn is operated by a hand-lever 17 intermediately fulcrumed to a bearing bracket 18 on the back of the body 5. This hand lever 17 is pivoted at its lower end to the rear end of the link 15, as indicated at 19.

When the wheels 13 are lowered they are below the runners 7 and lift the same from the ground, and when said wheels 13 are in operative positions they are beyond dead centers and are thus held in their operative positions. On the outer sides of the body 5 are open bottom guards 20 in which the wheels 13 are housed when raised.

The runners 7 are provided with spring shoes 21 that afford rockers for the vehicle. These shoes 21 are fitted over the upwardly curved front end portions of the runners 7 and rigidly secured thereto. The rear end portions of the shoes 21 are upwardly curved on semi-circles and then turned forwardly and reduced in width to afford tongues 22. These tongues 22 slidably extend through slots 23 in the upturned end portions of the runners 7 that afford keepers 24. The curved rear end portions of the shoes 21 facilitate the backing up of the vehicle.

The shoes 21 are downwardly bowed to form rockers for the vehicle by a pair of inturned cranks 25 that extend transversely over said shoes. These cranks 25 are on the outer ends of a pair of crank arms 26 on the outer ends of a rock shaft 27 journaled in bearings 28 on the under side of the body 5. On one of the crank arms 26 is a hand lever 29 for operating the rock shaft 27 to raise or lower the cranks 25. When the cranks 25 are in inoperative positions, they are in transverse notches 30 in the runners 7. When the cranks 25 are holding the shoes 21 bowed, they are beyond dead centers and the hand lever 29 is in engagement with a stop 31 on the respective side of the body 5.

From the above description, it is evident that the vehicle may be converted into a sled simply by manipulating the hand lever 17 to raise the wheels 13 and lower the vehicle onto the shoes 21. To convert the sled into a rocker, it is only necessary to manipulate the hand lever 29 to lower the cranks 25 and thus bow the shoes 21.

The shoes 21 may be used as a brake for the wheeled vehicle simply by moving the wheels 13 sufficiently to allow the shoes 21 to rest on the ground.

It is well known that, after a snowfall, there are some places on a sidewalk where the snow is removed, while other places are covered with snow and ice, and in such instances, the convertible vehicle is especially convenient as it can be instantly converted from a wheeled vehicle into a sled and vice versa.

From what has been said, it will be understood that the vehicle described is capable of modifications as to details of construction and arrangement within the scope of the invention herein disclosed and claimed.

What I claim is:

1. The combination with a body, of runners on the body, shoes for the runners, said shoes being attached to the runners at one of their ends with freedom for relative longitudinal movement, and means for downwardly bowing the shoes relative to the runners to afford rockers for the body.

2. The combination with a body, of runners on the body, shoes for the runners, said shoes being attached to the runners at one of their ends with freedom for relative longitudinal movement, a rock shaft journaled in bearings on the body, crank arms on the rock shaft, cranks on the outer ends of the crank arms extending transversely between the runners and the shoes, and means for operating the rock shaft to move the cranks downwardly onto the shoes and downwardly bow the same to afford rockers for the body.

3. The combination with a body, of runners on the body, shoes for the runners, said shoes being attached at one of their end portions to the runners, keepers on the runners for holding the other end portions of the shoes with freedom for relative longitudinal movement, and means for downwardly bowing the shoes to afford rockers for the body.

4. The combination with a body, of runners on the body, shoes for the runners, said shoes being anchored at their front ends to the runners, upstanding keepers on the runners and having transverse slots, the rear end portions of the shoes being folded upwardly and over themselves to afford tongues extending through the slots in the keepers with freedom for endwise sliding movement, and means for downwardly bowing the shoes to afford rockers for the body.

ARNE B. OSTBY.

REFERENCES CITED

The following references are of record in the file of this patent:

UNITED STATES PATENTS

| Number | Name | Date |
|---|---|---|
| Re. 21,083 | Lyon | May 16, 1939 |
| 598,291 | Houde | Feb. 1, 1898 |
| 950,583 | Vicks | Mar. 1, 1910 |
| 1,060,123 | Raymond | Apr. 29, 1913 |
| 1,195,233 | Kollner | Aug. 22, 1916 |
| 1,677,011 | Adams | July 10, 1928 |